April 19, 1932. R. J. OLANDER 1,854,805
HAND BRAKE
Filed Aug. 1, 1930
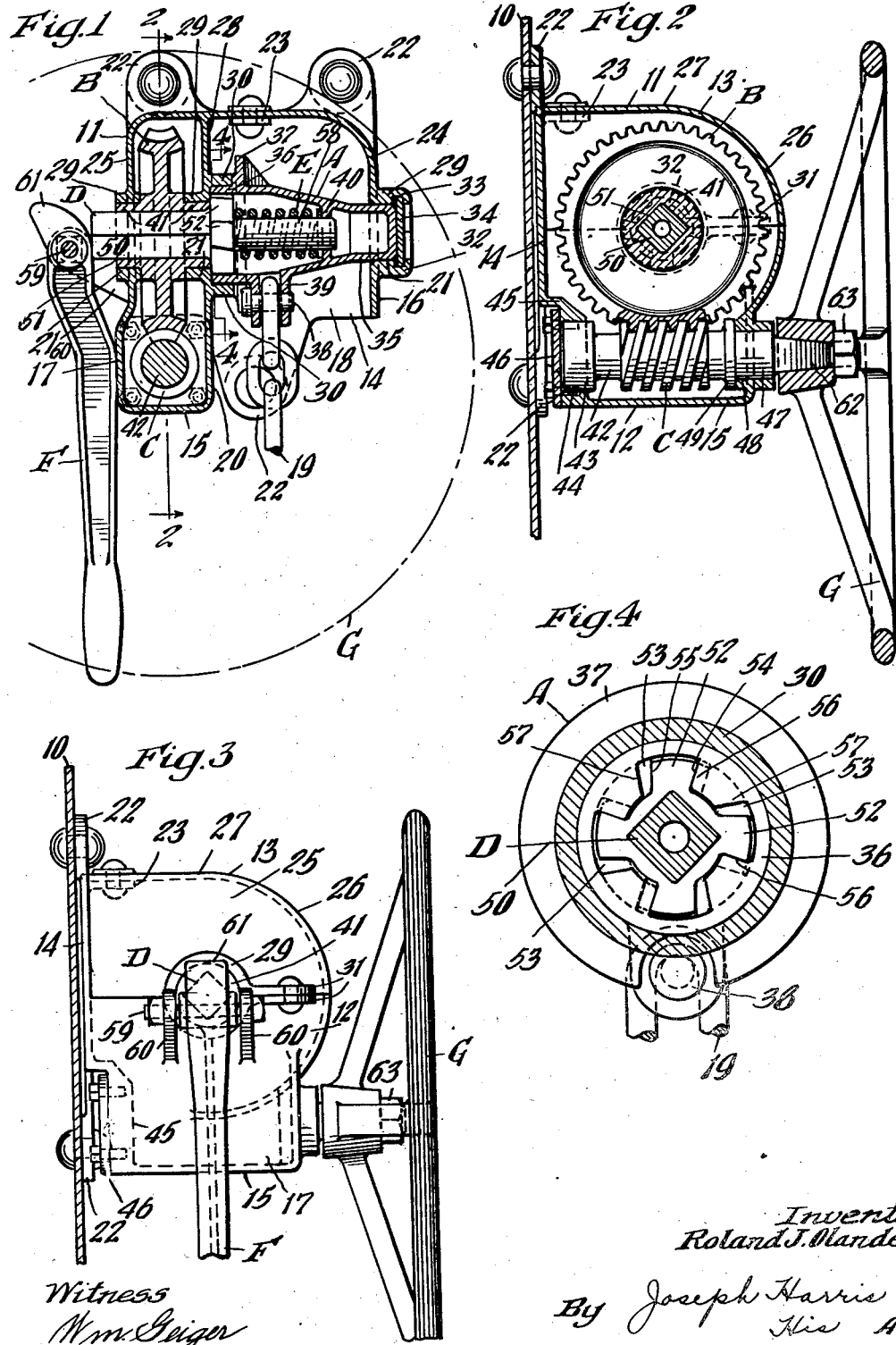
Inventor
Roland J. Olander
By Joseph Harris
His Atty.
Witness
Wm. Geiger Patented Apr. 19, 1932

1,854,805

UNITED STATES PATENT OFFICE

ROLAND J. OLANDER, OF CHICAGO, ILLINOIS, ASSIGNOR TO W. H. MINER, INC., OF CHICAGO, ILLINOIS, A CORPORATION OF DELAWARE

HAND BRAKE

Application filed August 1, 1930. Serial No. 472,235.

This invention relates to improvements in hand brakes.

One object of the invention is to provide in a hand brake mechanism of the power-multiplying gear type especially adapted for use in connection with railway cars, including a chain winding drum, manually actuated rotary means for rotating the drum, and releasable clutch means operatively connecting the drum to the actuating means, wherein the interengaging parts of the clutch means are so designed that binding thereof is prevented, thus assuring easy and quick releasing action of the same.

A more specific object of the invention is to provide a clutch mechanism for a brake of the character indicated in the preceding paragraph, wherein the clutch elements are rotatable and are provided with cooperating interengaging fingers having the engaging portions thereof so arranged that the driving forces are all transmitted in directions substantially normal to the radii of the axis of rotation of the clutch elements, and wherein the cooperating clutch faces are also inclined lengthwise with respect to the axis of rotation of the clutch elements, in such a direction that the tension of the brake chain when the brakes are tightened assists in the releasing action of the clutch means.

Other objects of the invention will more clearly appear from the description and claims hereinafter following.

In the drawings, forming a part of this specification, Figure 1 is a vertical sectional view through my improved hand brake mechanism, illustrating the same applied to the end wall of a railway car, the section being in a plane parallel to said end wall. Figure 2 is a vertical, transverse, sectional view corresponding substantially to the line 2—2 of Figure 1. Figure 3 is a side elevational view of my improved hand brake mechanism looking from the left in Figure 1. And Figure 4 is an enlarged, transverse, vertical, sectional view corresponding to the line 4—4 of Figure 1 and illustrating the details of the improved clutch mechanism.

In said drawings, 10 designates the vertical end wall of a railway car to which my improved brake mechanism is secured, the operative parts of the hand brake mechanism being preferably enclosed within a housing 11.

In carrying out my invention, I preferably form the housing of two parts, so as to render the operating parts of the brake mechanism accessible. The housing comprises a main section 12 and a cover section 13. The main section 12 has a vertically disposed back wall 14, a horizontal bottom wall 15, and vertically disposed side wall members 16 and 17. The side wall members 16 and 17 are of lesser height than the vertical back wall 14, as clearly shown in Figures 1, 2 and 3. The section 12 of the housing is open at the bottom, on the righthand side thereof, as viewed in Figure 1, the opening being indicated by 18, and accommodating the brake chain 19 for movement.

The brake chain, which is shown broken away, is connected to the brake mechanism proper of the railway car, not shown, in the usual well known manner. The bottom section of the housing is also provided with a vertical partition wall 20 corresponding in height to the walls 16 and 17 and extending in a plane at right angles to the back wall of said housing section. The partition wall 20 divides the housing section 12 into two compartments, the lefthand compartment, as viewed in Figure 1, serving to house certain parts of the actuating means. Each of the walls 16, 17 and 20 of the housing section 12 is provided with a partial bearing member 21 at the upper end thereof, the bearing members 21 being in axial alinement. The back wall 14 of the housing section 12 is provided with securing ears or lugs 22—22, two of said lugs projecting upwardly from said wall and the remaining lug projecting downwardly. The housing section 12 may be secured to the end wall 10 of the car by any suitable means, and as herein shown is secured by rivets extending through the ears 22 and said wall. Centrally of the back wall 14 at the upper edge thereof a forwardly projecting horizontal lug 23 is provided, by means of which the cover section 13 is supported at the top thereof. The cover section 13 has side walls 24 and 25, which are disposed vertically and are in vertical alinement with the walls 16 and 17 respectively of the housing section 12. The housing section 13 also has a curved front wall 26, which terminates in a horizontal top wall 27 at the upper end of the housing. The top wall 27 overlies the lug 23 of the back wall 14 and is secured thereto by means of a rivet or other securing element. The cover section 13 is also provided with a vertical partition wall 28, which is in alinement with the partition wall 20 of the section 12 and forms together therewith a continuous partition member between the two chambers of the housing proper. The walls 24, 25 and 28 are provided with partial bearing members 29—29 at the bottom ends thereof which register with the bearing members 21 of the main section 12 of the housing and together with the latter form complete bearing members for a purpose hereinafter pointed out. The partition walls 20 and 28 of the two housing sections are provided with arc shaped projecting flanges 30—30 at the righthand side thereof, as viewed in Figure 1, adjacent the partial bearing members and together form a continuous annular bearing of larger diameter than the adjacent bearing formed by the partial bearing members. The side walls of the top and bottom housing sections are provided with laterally projecting exterior securing ears or flanges 31—31 by which the two sections are secured together, rivets or other similar securing means being employed. The bearing openings of the bearing members formed in the walls and partition members of the top and bottom sections of the housing are all suitably reinforced by annular ribs surrounding said openings. The reinforcing ribs of the bearing opening at the righthand side of the housing, as viewed in Figure 1, are thickened as shown, thereby forming in effect a boss member 32. The boss member 32 has the sections thereof provided with an interior annular groove 33, within which a cover disc or plate 34 is secured, closing the boss and also serving as a bearing or wear plate, as hereinafter pointed out.

My improved hand brake mechanism proper comprises broadly a chain winding drum A; a worm wheel B; a worm element C; a sliding clutch member D; a clutch spring E; a lever actuated cam means F; and an operating hand wheel G.

The chain winding drum A is in the form of a hollow casting having the chain winding section thereof of substantially conical form. At the righthand end, the drum A is of cylindrical exterior cross section, thereby providing a bearing element 35 journaled within the boss 32. At the opposite end, the drum member is open, as most clearly shown in Figure 1, and is provided with a cylindrical bearing portion 36 of larger diameter than the bearing portion 35 thereof, said bearing portion 36 being journaled within the bearing opening provided by the curved ribs 30—30. To the right of the bearing portion 36, the drum has an exterior guide rib or flange 37 for guiding the chain 19 while it is being wound on the drum. The innermost link of the chain 19 is fixed to the drum by means of a securing pin 38 extending through the flange 37 and a spaced lug 39 on the drum. Inwardly of the bearing portion 35, the drum has an interior annular rib 40 providing an axial guide opening for a purpose hereinafter pointed out.

The worm wheel B is mounted within the lefthand chamber of the housing, as seen in Figure 1, the same being provided with cylindrical bearing members 41—41 at opposite sides of the hub thereof, which are journaled in the bearing openings provided by the partial bearing members in the partition walls of the housing and in the end wall sections 17 and 25 thereof.

The worm C is formed integral with a shaft member 42, which is journaled within the bottom of the lefthand compartment of the housing, as seen in Figure 1, and supported so as to mesh with the teeth of the worm wheel B. Immediately adjacent the threaded portion of the worm C, the shaft 42 is of reduced diameter, as clearly shown in Figure 2. At the rear end, the shaft 42 has a cylindrical bearing portion 43 of at least as great a diameter as the threaded portion of the worm, which bearing portion is journaled in a bearing opening 44 provided in an outwardly offset portion 45 of the back wall 14 of the main section 12 of the housing. The portion 44 of the wall is preferably thickened, as shown, so as to provide ample bearing surface. The opening is closed by a cover plate 46, which is secured to the offset section 44 of the wall by means of a plurality of cap screws. At the outer end, the shaft 42 is of smaller diameter than the bearing portion 43 thereof, as indicated at 47. The cylindrical bearing portion 47 of the shaft is journaled in a bearing opening 48 provided in the front wall of the section 12 of the housing. The bearing opening is preferably reinforced by outer and inner annular ribs or flanges, as most clearly shown in Figure 2. Immediately adjacent the bearing portion 47, the shaft is provided with an annular retaining and bearing rib 49 which normally abuts the inner end of the interior reinforcing rib of the bearing opening 48. As shown in Figure 2, the annular flange 49 is spaced an appreciable distance from the front end of the worm threads of the worm member C.

The sliding clutch member D has a section of substantially square shape 50 which is slidable within the hub portion of the worm wheel B, said hub portion being provided with an axial opening 51 of square cross section within which the portion 50 of the clutch member D fits and is reciprocable. Inwardly of the square portion 50, the clutch member is provided with a plurality of radially projecting clutch arms or fingers 52—52 which engage within slots 53—53 provided within the lefthand end portion of the drum A, as viewed in Figure 1. The clutch fingers 52 and the cooperating slots 53 are preferably four in number, as clearly shown in Figure 4. Each clutch finger is provided with a clutching or driving face 54, which is substantially radial to the axis of rotation of the clutch member but is inclined lengthwise of said axis, as clearly indicated in Figures 1 and 4, the same being inclined away from said axis in a righthand direction, as viewed in Figure 1. The face at the opposite side of the clutch finger, which is indicated by 55, is preferably disposed in a plane parallel to the axis of the clutch member. Each slot 53 of the chain winding drum is provided with opposed walls 56 and 57 which are respectively parallel to the faces 54 and 55 of the corresponding finger 52. Each of the clutch fingers 52 is of lesser width than the corresponding slot 53, whereby substantial clearance is provided between the wall 57 of each slot and the face 55 of the corresponding cooperating finger 52. To the right of the clutch portion, as viewed in Figure 1, the sliding clutch member D is provided with a cylindrical axial guide arm 58 of such a diameter as to fit the opening defined by the rib 40 of the drum A and be slidingly guided thereby. The clutch spring E is interposed between the clutch section of the clutch member and the rib 40 of the chain winding drum and surrounds the guide stem or arm 58 and normally maintains the clutch fingers 52 in clutching engagement with the slots of the drum. Immediately adjacent the slotted portion of the drum, the interior diameter is such, as clearly shown in Figure 1, that the clutch fingers 52 of the member D are freely rotatable therein when the clutch member is shifted to the right, as viewed in Figure 1, to disengage the clutch fingers. The square portion of the clutch member D normally projects outwardly of the corresponding side wall of the housing and bears on the clutch operating cam lever F. The lever F is pivotally secured to the housing section 12 by means of a pivot bolt 59 extending through projecting supporting lugs 60—60 on the wall 17. Above the pivot portion thereof, as viewed in Figure 1, the operating lever F is provided with a cam head or finger 61, which engages with the outer end of the sliding clutch member D. The operating hand wheel G is secured to the outer end of the shaft 42 which carries the worm element C, the outer end of the shaft having a portion 62 of square cross section, which is tapered as shown, and fits within a simlar opening in the hub of the hand wheel. The hand wheel is preferably locked to the shaft 42 by means of a securing nut 63 threaded on the outer end of the shaft.

In assembling my improved hand brake mechanism, the worm member is first placed within the section 12 of the housing by entering the same through the opening 44 in the rear wall 14. After the worm has been inserted, the cover plate 46 is attached, thereby holding the parts assembled. The chain winding drum A with the clutch member D and the worm wheel B assembled therewith is then assembled with the housing section 12 by engaging the bearing portions of the drum and worm wheel within the cooperating partial bearing members of the housing section. The cover section 13 of the housing is then applied by securing the stem to the section 12, the bearing members of this section being engaged over the bearing portions of the drum and worm wheel. Before the housing section 13 is attached, the cover or bearing disc 34 is placed within the groove of the boss 32, whereby the boss is closed when the housing sections are secured together. The operating lever F and the hand wheel G are then attached to the housing and shaft 42 respectively. The operation of my improved hand brake mechanism in tightening the brakes is as follows: The hand wheel G is rotated in a clockwise direction, as viewed in Figure 1, thereby rotating the worm C in a corresponding direction and causing rotation of the worm wheel D in a clockwise direction, as viewed in Figure 2. Inasmuch as the clutch member D is held in clutching engagement with the drum by the spring E, at this time, the chain winding drum will be rotated with the worm B and the chain wound thereon. As will be evident, during the chain tightening operation, backward rotation of the hand wheel is prevented due to the enormous friction existing between the cooperating threads of the worm wheel and the worm element.

To release the brakes quickly, the lever F is pulled to the left, as viewed in Figure 1, thereby swinging the cam finger or head 61 on the pivot bolt and forcing the clutch member D to the right, as viewed in Figure 1, against the tension of the spring E. The clutch fingers 52 will thus be displaced to the right in the slots 53 and disengaged therefrom. When the clutch means has been disengaged, the chain winding drum A is free to rotate with respect to the worm wheel B, thereby permitting the chain to unwind and the brakes to quickly release. Inasmuch as the worm wheel and drum are entirely disconnected when the clutch is disengaged, free running of the chain winding drum is had without rotation of the hand wheel G, thereby protecting the brakeman against injury due to spinning of the hand wheel.

To ease off or back up the brakes, the hand wheel G is operated in a contra-clockwise direction, as viewed in Figure 1, while the clutch member D is in clutching engagement with the chain winding drum.

As will be evident upon reference to Figure 1, the inclined cooperating faces of the clutch fingers and the walls of the slots of the chain winding drum provide for easy release of the clutch member. The tension of the brake chain when tightened is in such a direction that the inclined walls of the slots 53 of the drum will tend to wedge the clutch fingers 52 to the right, as viewed in Figure 1, by the wedging engagement thereof with the inclined cooperating faces of said fingers.

After the clutch member D has been disengaged from the drum and the brakes have been fully released and the drum comes to a rest, the action of the spring E will force the clutch member D to the left, as viewed in Figure 1, thereby automatically re-engaging the clutch fingers within the slots of the drum. The fact that the slots are of greater width than the clutch fingers facilitates this re-engaging action. In case the clutch fingers do not properly register with the clutch slots of the chain winding drum when the drum comes to rest, a slight rotation of the hand wheel will bring the clutch fingers in proper alinement with the slots to effect re-engagement of these members.

From the preceding description taken in connection with the drawings, it will be evident that I have provided a very efficient clutch mechanism in connection with a power multiplying hand brake comprising a driving member and a chain winding drum, which are connected by a releasable clutch means. Further, by providing clutch fingers which have shouldered engagement with clutch means on the drum presenting cooperating engaging faces, which are substantially radial to the axis of rotation of the clutch member and drum, easy release of the clutch is assured, inasmuch as the driving forces are all normal to the radii of the axis of rotation of the clutch member. Another important advantage of my improved clutch mechanism lies in the releasing action produced by the cooperating wedging engagement of the driving faces of the clutch elements.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a hollow, rotary chain tightening drum having internal clutch projections; of manually actuated rotary operating means; releasable manually actuated clutch means operatively connecting said element and operating means, said clutch means including a rotatable member extending into said hollow drum, said member having peripheral clutch projections having shouldered engagement with the projections of the drum on faces inclined lengthwise to the axis of rotation of said elements in a direction to urge said members apart due to the force applied by the pull of the chain in brake releasing direction; and means for operating said clutch means.

2. In a clutch mechanism, the combination with a rotary element adapted to transmit power; of manually actuated rotary operating means for rotating said element in one direction; releasable manually actuated clutch means operatively connecting said element and operating means, said clutch means including a pair of rotary clutch members having interengaging clutch fingers provided with cooperating radially disposed engaging faces inclined to the axis of rotation of said members in a direction tending to wedge said clutch members apart upon a force being applied to the rotary element tending to rotate the same in a direction reverse to said first named direction; and lever means for actuating said clutch means.

3. In a hand brake mechanism, the combination with a rotary brake tightening element; of manually actuated rotary operating means for rotating said element in chain tightening direction; releasable manually actuated clutch means operatively connecting said element and operating means, said clutch means including a pair of rotary clutch members, said clutch member being axially movable with respect to each other and having interengaging clutching projections having cooperating clutch faces disposed radially to the axis of rotation of said members and inclined lengthwise of said axis of rotation in a direction tending to wedge said clutch members apart upon a force being applied to the rotary element tending to rotate the same in chain unwinding direction; and lever means for actuating said clutch means.

4. In a hand brake mechanism, the combination with a rotary hollow chain winding drum having interior clutch shoulders; of a worm wheel, said drum and wheel being rotatable about a common axis, said wheel having a square opening axially thereof; a clutch member slidable with respect to the drum and wheel, said member having a square section slidably fitting the opening of the worm wheel, said member having a portion thereof extending into the hollow drum, said portion having radial clutch fingers engaging with the shoulders of said drum; spring means for urging said clutch member in clutching engagement; a lever operated cam means for disengaging said clutch member; a worm member meshing with said worm wheel; and manually actuated means for rotating said worm.

5. In a hand brake mechanism, the combination with a chain winding drum element; of a rotary driving element, said drum element and driving element being in axial alignment; a clutch member fixed to one of said elements; a cooperating movable clutch member slidable axially of said elements and connected to the other element for rotation therewith, each of said clutch members having cooperating spaced projections, the spaces between said projections being of greater width than the projections, each of said projections having a face on one side substantially parallel to the axis of rotation of the clutch members and a face on the opposite side inclined lengthwise with respect to the direction of axial sliding movement of said movable member, said inclined faces of the projections of the two members engaging with each other to establish driving relation between the driving element and drum element; and a cam operated lever means engaging said movable clutch member for sliding the same axially to engage said inclined faces of the clutch projections of said member with the inclined faces of the clutch projections of the other member.

In witness that I claim the foregoing I have hereunto subscribed my name this 29th day of July 1930.

ROLAND J. OLANDER.